(12) United States Patent
Beecher, II et al.

(10) Patent No.: US 6,291,767 B1
(45) Date of Patent: Sep. 18, 2001

(54) DATA/COMMUNICATIONS DISTRIBUTION BOX

(75) Inventors: Rober L. Beecher, II, Fishers, IN (US); Ryan F. Hahn, Omaha, NE (US); William Charles MacKenzie, Baltimore, MD (US); David Louis Reed, Fountaintown; Stanley Everett Wright, Indianapolis, both of IN (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/405,783

(22) Filed: Sep. 27, 1999

(51) Int. Cl.[7] ........................................ H01J 5/00
(52) U.S. Cl. ................. 174/50; 174/58; 174/63; 220/4.02; 439/709
(58) Field of Search .................. 174/48, 50, 58, 174/63, 60, 17 R; 220/3.2, 3.8, 4.02, 3.3; 248/906; 439/189, 709, 922; 361/828, 826

(56) References Cited

U.S. PATENT DOCUMENTS

| | | | |
|---|---|---|---|
| 4,103,985 | * | 8/1978 | Krolak et al. ........................ 439/367 |
| 4,213,013 | * | 7/1980 | Perna et al. ....................... 361/826 X |
| 4,242,721 | * | 12/1980 | Krolak et al. ......................... 361/686 |
| 4,303,296 | * | 12/1981 | Spaulding ............................ 439/189 |
| 5,161,997 | * | 11/1992 | DeFibaugh et al. .................. 439/532 |
| 5,483,409 | * | 1/1996 | Heidorn et al. ....................... 361/119 |
| 5,923,807 | | 7/1999 | Wild ..................................... 385/135 |
| 5,929,381 | * | 7/1999 | Daoud ................................ 174/72 A |
| 6,060,660 | * | 5/2000 | Bauer ................................... 174/52.1 |

\* cited by examiner

Primary Examiner—Dean A. Reichard
Assistant Examiner—Dhiru R Patel
(74) Attorney, Agent, or Firm—Thomas, Kayden, Horstemeyer & Risley, LLP

(57) ABSTRACT

The present disclosure relates to a data/communications distribution box that forms an interior space which can be closed with a cover and a plurality of cable openings adapted to permit the passage of cable into and out of the interior space. Inside the interior space are a plurality of connector brackets which each include a plurality of mounting ports that are adapted to receive a variety of different types of connector modules which are used to connectorize data/communications wires and fibers.

33 Claims, 5 Drawing Sheets

DATA/COMMUNICATIONS DISTRIBUTION BOX

FIELD OF THE INVENTION

The present invention relates to a wiring box that provides for the distribution of data and telecommunication signals throughout a designated work area. More particularly, the following disclosure relates to a data/communication distribution box that can be used as a consolidation point as defined by the Telecommunications Industry Association/Electronic Industries Association ("TIA/EIA TSB75").

BACKGROUND OF THE INVENTION

Modern office buildings typically contain what is known as vertical wiring and horizontal wiring for all data and telecommunications information transfer. Vertical wiring is the wiring that extends from the point where connection with an outside source of the data and telecommunication wires is made, usually in the basement of the building, to each of the several floors of the office building. Horizontal wiring, on the other hand, is the wiring that extends from the telephone closets located on each floor to the various work stations located thereon.

Previously, if it was desired to rearrange an office, for example, rearrange the configuration of a plurality of modular offices, also known as cubicles, it was necessary to reroute all of the horizontal wiring associated with those offices all the way back to the floor's telephone closets. In that this situation made the reconfiguration of offices both expensive and impractical, the TIA/EIA came out with a technical service bulletin entitled "TIA/EIA TSB75" which now permits offices to use so-called consolidation points which serve as intermediate interconnection points between the telephone closets and the various offices the closets serve. These consolidation points can be placed, for example, in separate designated zones of an office floor so that a particular consolidation point services all of the offices within the designated zone. Accordingly, such a consolidation point can be positioned, for example, every 15 to 30 feet such that, if the offices of a particular zone are reconfigured, it will only be necessary to reroute the wires that extend from the individual offices to their associated consolidation point. Therefore, despite the reconfiguration of the office zone, the horizontal wiring that extends from the consolidation points to the telephone closet need not be disrupted.

TIA/EIA TSB75 permits such consolidation points to be located within environmental air spaces of office buildings. Environmental air spaces include the space between the ceiling and the drop ceiling of each floor. In that this space commonly is used for return air of the air conditioning and heating systems of the floor, TIA/EIA TSB75 requires that the consolidation points satisfy certain safety requirements so as to reduce the possibility of the spread of fire and toxic gases within the environmental air space. Accordingly, connections that are made at the consolidation point must be contained in some manner so as to subdue sparks, flames, and gases that could originate from the consolidation point.

From the above, it can be appreciated that it would be desirable to have a device which would facilitate the formation of consolidation points conforming with TIA/EIA TSB75, as well as which would provide for multiple connections with a variety of different types of connectors to simplify office rearranging, and insure a measure of safety in the connections.

SUMMARY OF THE INVENTION

The present invention is a data/communications distribution box, comprising a base, first and second ends, and first and second sides. The base, ends, and sides form an interior space which can be closed with a cover that is sized and configured to fit about the first and second ends and the first and second sides. The first end of the distribution box includes a plurality of cable openings adapted to permit the passage of cable into and out of the interior space. Inside the interior space are a plurality of connector brackets, each of which includes a plurality of mounting ports that are adapted to receive a variety of different types of connector modules which are used to connectorize data/communications wires and/or fibers.

The features and advantages of this invention will become apparent upon reading the following specification, when read in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
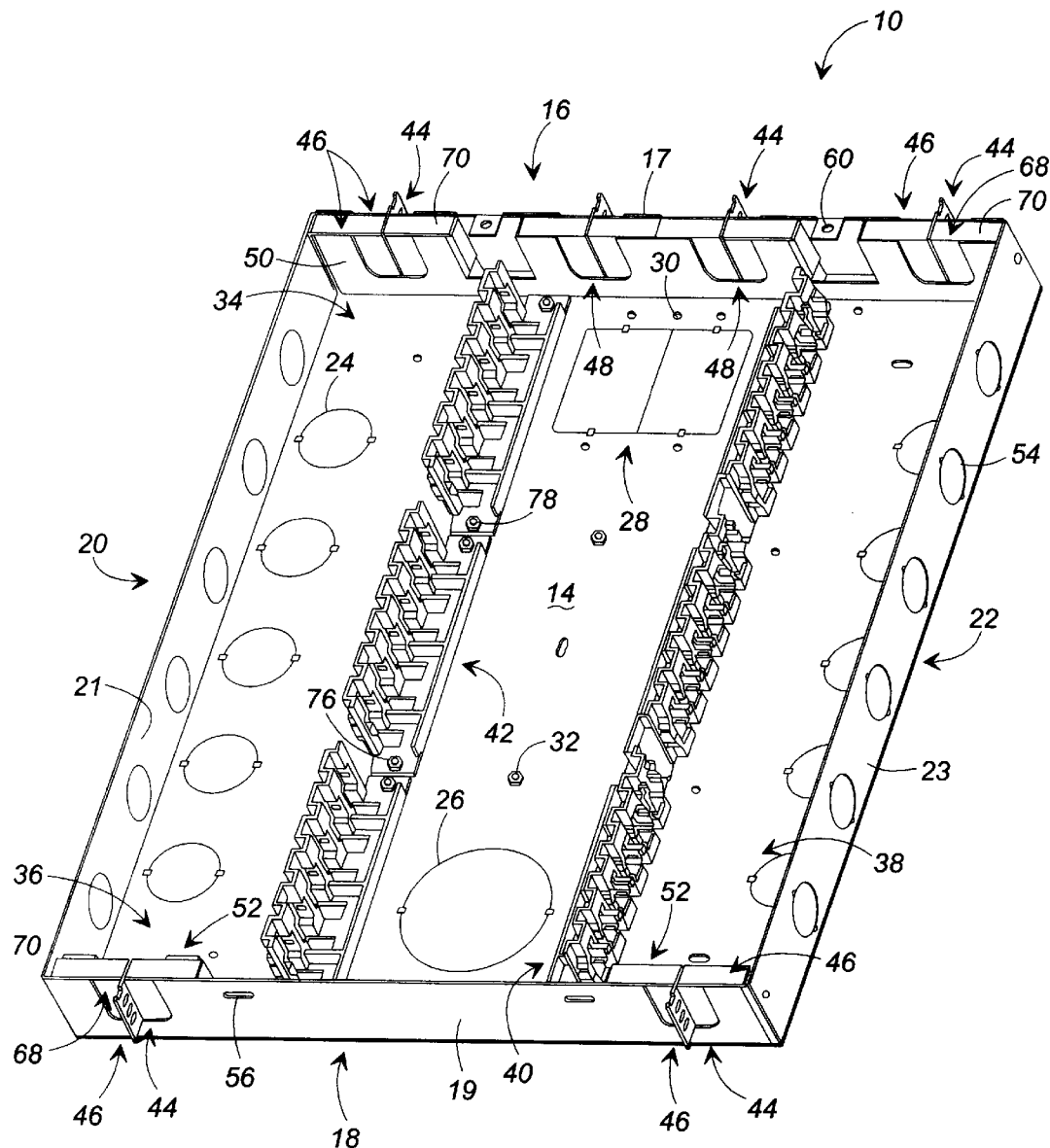
FIG. 1 is a perspective view of the data/communication distribution box of the invention shown without a cover.
Figure 2:
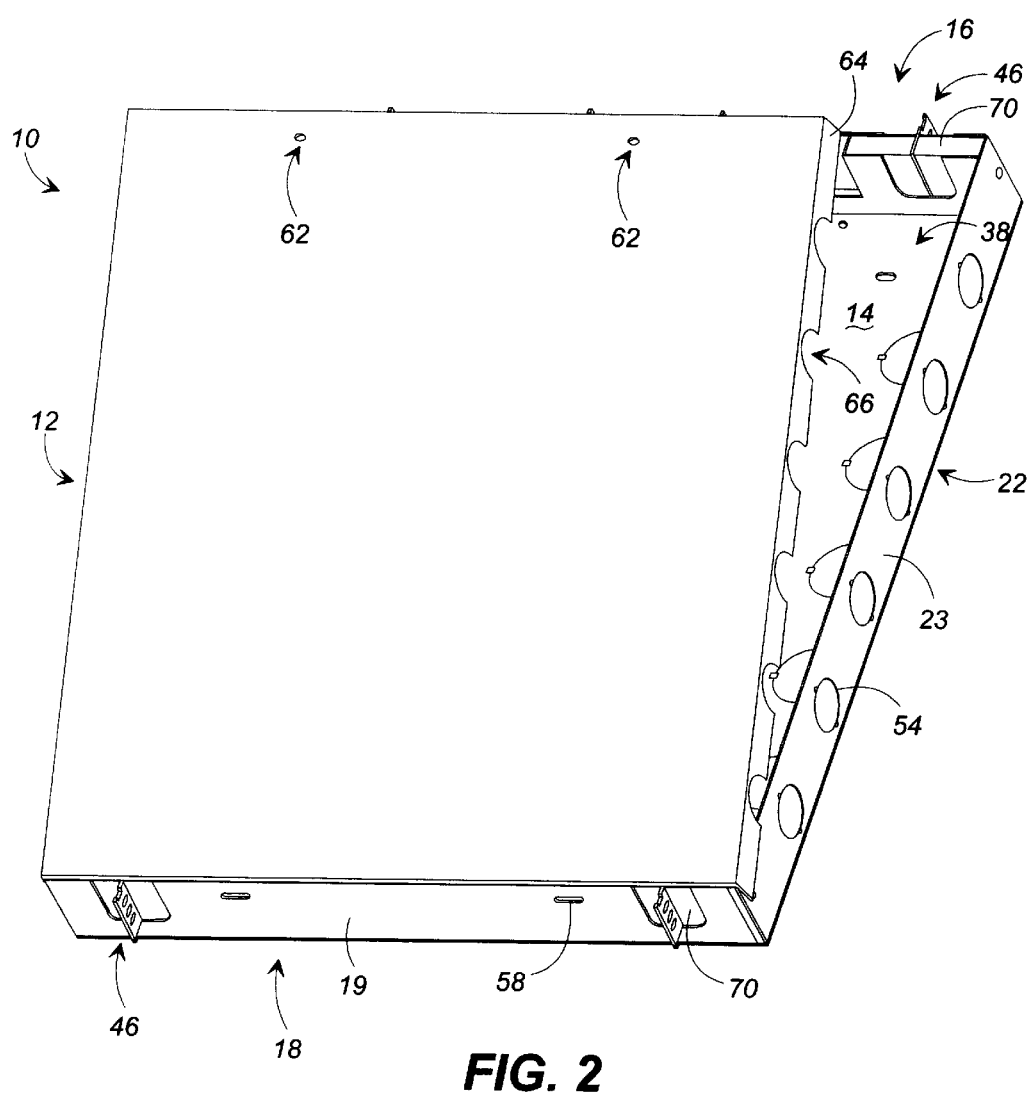
FIG. 2 is a perspective view of the distribution box shown in FIG. 1 and including a cover.

Referring now in more detail to the drawings, in which like numerals indicate corresponding parts throughout the several views, FIGS. 1 and 2 illustrate an embodiment of the data/communication distribution box 10 of the invention. As indicated in FIG. 2, the distribution box 10 normally includes a cover 12 which is not shown in FIG. 1 so as to avoid obstruction of the view of the interior of the box. With reference to FIG. 1, the distribution box 10 generally comprises a base 14, a first end 16, a second end 18, a first side 20, and a second side 22. Typically, the first and second ends 16 and 18 include first and second end walls 17 and 19, respectively, and the first and second sides 20 and 22 include first and second side walls 21 and 23, respectively. The base, end walls, and side walls of the box 10 normally are constructed of a sheet metal material. By way of example, each of these components can be formed from a single piece of steel sheet metal of approximately 0.06 inches in thickness. To inhibit corrosion, all such steel surfaces described herein can be covered with a powder material so as to form a powder coating.

The base 14 of the distribution box 10 includes a plurality of substantially circular punch-outs 24 which, as is described hereinafter, can be used to connect cable conduits (not shown) to the distribution box to facilitate wiring of the modular offices. Preferably, each of these substantially circular punch-outs 24 is sized and configured to UL standards. Accordingly, by way of example, these substantially circular punch-outs 24 can be approximately 1 inch in diameter. In addition to these punch-outs 24, the base 14 can include a relatively large, substantially circular punch-out 26 which is adapted to receive a relatively large cable conduit, and a substantially rectangular punch-out 28, which, as is discussed hereinafter, can be used to facilitate the passage of cable from a cable raceway (not shown) to the interior of the box 10. The relatively large circular punch-out 26 typically will have a diameter of approximately 2.5 inches while the substantially rectangular punch-out can, by way of example, be approximately 1.5 inches by 2.5 inches in dimension. The base 14 of the distribution box 10 can include a plurality of mounting holes 30 that are used to mount the box in place within the office, and one or more threaded openings 32 that, as is described in the following, can be used to mount fiber reels within the box.

The distribution box 10 forms an interior space 34 which preferably is divided into first and second lateral spaces 36 and 38 and a central space 40. These spaces normally are formed by the arrangement of one or more connector brackets 42 that are arranged in aligned rows within the interior space 34. Further positioned within the interior space 34 of the box 10 is an insulation fence 50 that is placed adjacent the first end 16 of the box. Adjacent the second end 18 of the box 10 are cable retainers 52.

As further illustrated in FIG. 1, both the first end 16 and the second end 18 of the distribution box 10 are provided with cable openings 44 which permit data and/or communication cables to pass into and out of the box. When the interior space 34 of the box 10 is divided into central and lateral spaces in the manner described in the foregoing, these cable openings can be more specifically described as exit openings 46 and entrance openings 48 which correspond to the lateral spaces 36, 38 and to the central space 40, respectively. Formed in each side 20, 22 of the distribution box 10 is a plurality of substantially circular punch-outs 54 which, as with the substantially circular punch-outs 24 of the base 14, preferably are sized and configured to standard UL dimensions. Accordingly, by way of example, the substantially circular punch-outs 54 of the sides 20, 22 can be approximately 0.75 inches in diameter. As is indicated in FIG. 1, the second end 18 normally includes tab slots 56 which, as is indicated in FIG. 2, are adapted to receive alignment tabs 58 of the box cover 12. The first end 16 includes cover mounting holes 60 which are arranged so as to align with mounting holes 62 provided in the cover 12 (FIG. 2). As is further illustrated in FIG. 2, the cover 12 normally includes side flanges 64 which are arranged so as to overlap the first and second side walls 21 and 23 of the box 10 when in the closed position. To ensure that the side flanges 64 do not interfere with the connection of conduits to the connection box 10, the side flanges normally include a plurality of arcuate notches 66 which are arranged so as to align with the substantially circular punch-outs 54 formed in the sides 20, 22 of the box 10.

Figure 3:
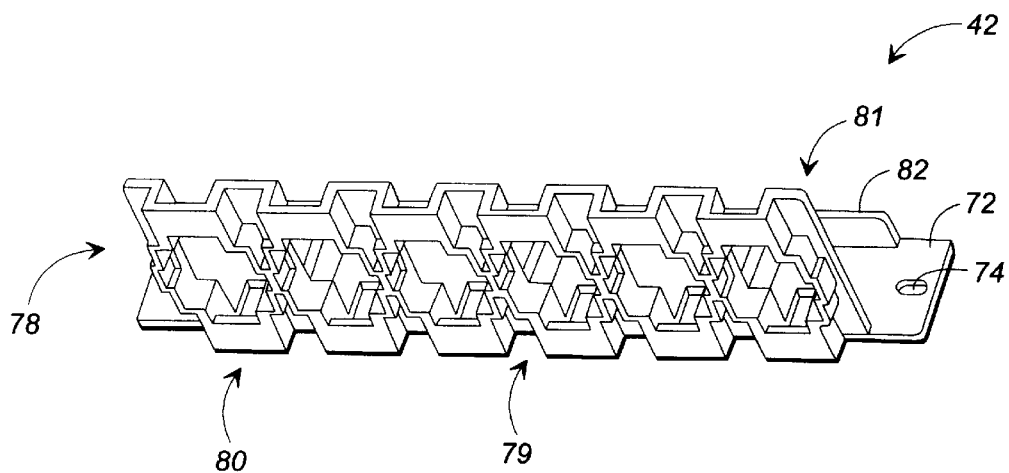
FIG. 3 is a perspective view of a connector bracket used with the distribution box shown in FIGS. 1 and 2.

FIG. 3 illustrates the connector bracket in detail. As indicated in this figure, the connector bracket 42 includes an elongated base 72 having a front side 79 and a rear side 81. This base 72 normally includes one or more mounting holes 74 with which the connector bracket 42 can be secured to the interior space 34 of the distribution box 10. Typically, such securing of the connector brackets 42 is accomplished with a plurality of threaded mounting studs 76 which are adapted to receive fastening elements 78 such as a threaded nut (FIG. 1). Extending upwardly from the bracket base 72 at its front side 79 is an elongated connectorization portion 78. The connectorization portion 78 includes one or more mounting ports 80 which are adapted to receive various types of connector modules (see FIG. 6) which facilitate connectorization of the various data/communications wires and fibers. Extending upwardly from the bracket base 72 at its rear side 81 is a module support 82. As the name suggests, this module support is adapted to support the connector modules once disposed in the mounting ports 80 of the connector bracket 42. Typically, each connector bracket is constructed of a polymeric material such as a polycarbonate/ABS plastic blend.

Figure 4:
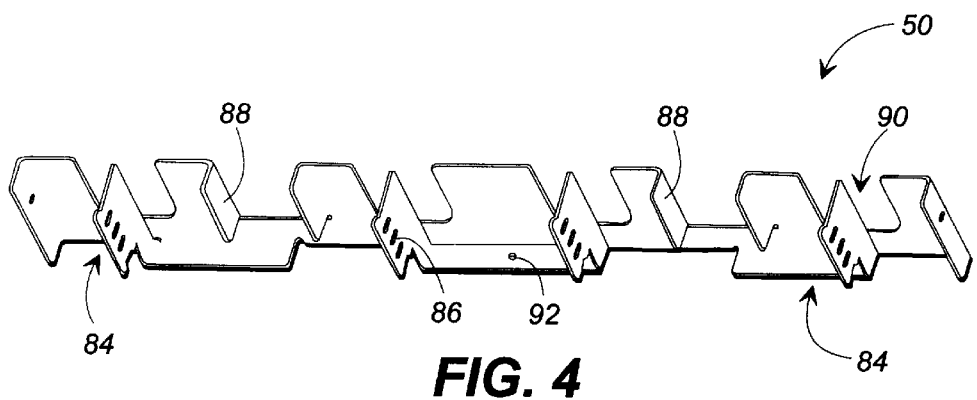
FIG. 4 is a perspective view of an insulation fence used with the distribution box shown in FIGS. 1 and 2.

With reference to FIG. 4, the insulation fence 50 will be described. As indicated in this figure, the insulation fence 50 normally is constructed from a single piece of sheet metal such as 0.06 steel sheeting. The insulation fence 50 includes a plurality of strain reliefs 84, each of which includes one or more tie openings 86. As is known in the art, such strain reliefs 84 can be used to secure one or more cables in place with, by way of example, a cable tie (not shown) which can extend through the tie openings 86. The insulation fence 50 further includes a plurality of spacer members 88 which are adapted to maintain a predetermined amount of spacing between the fence and the first end 16 of the distribution box 10. As indicated in FIG. 1, the insulation fence 50 in particular is configured so as to fit within the box 10 such that a plurality of insulation spaces 68 are formed between the insulation fence and the first end 16 of the box. Preferably, these insulation spaces 68 are approximately 0.5 inches in thickness such that a plurality of 0.5 inch thick insulation members 70 can be disposed within the insulation spaces as shown in FIG. 1. By way of example, the insulation members can comprise fire foam composed of a low smoke flame resistant material. When disposed in this manner, the insulation members 70 substantially block the cable openings 44 of the distribution box 10 to prevent the passage of sparks, flames, and gases from the interior of the box to the environment in which it is placed. The insulation fence 50 includes a plurality of spaces 90 which, as is apparent from FIG. 1, forms part of each cable opening 44 at the first end 16 of the distribution box 10. The insulation fence 50 normally is secured to the interior 34 of the distribution box 10 with fasteners (not shown) which extend through one or more mounting holes 92 formed in the insulation fence.

Figure 5:
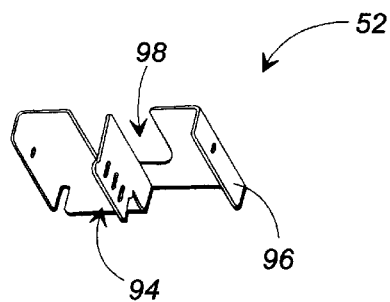
FIG. 5 is a perspective view of a cable retainer used with the distribution box shown in FIGS. 1 and 2.

Turning to FIG. 5, the cable retainer 52 is shown in detail. Similar in construction to the insulation fence 50, the cable retainer 52 normally is constructed of a sheet metal such as 0.06 inch steel sheet metal. Like the insulation fence 50, the cable retainer 52 includes a strain relief 94, one or more spacer members 96, and at least one space 98 which, as is shown in FIG. 1, forms part of the cable opening 44 at the second end 18 of the distribution box 10. Accordingly, the cable retainer 52, like the insulation fence, facilitates placement of insulation members 70 at the cable opening 44 at the second end 18 of the box 10 as is depicted in FIG. 1.

Figure 6:
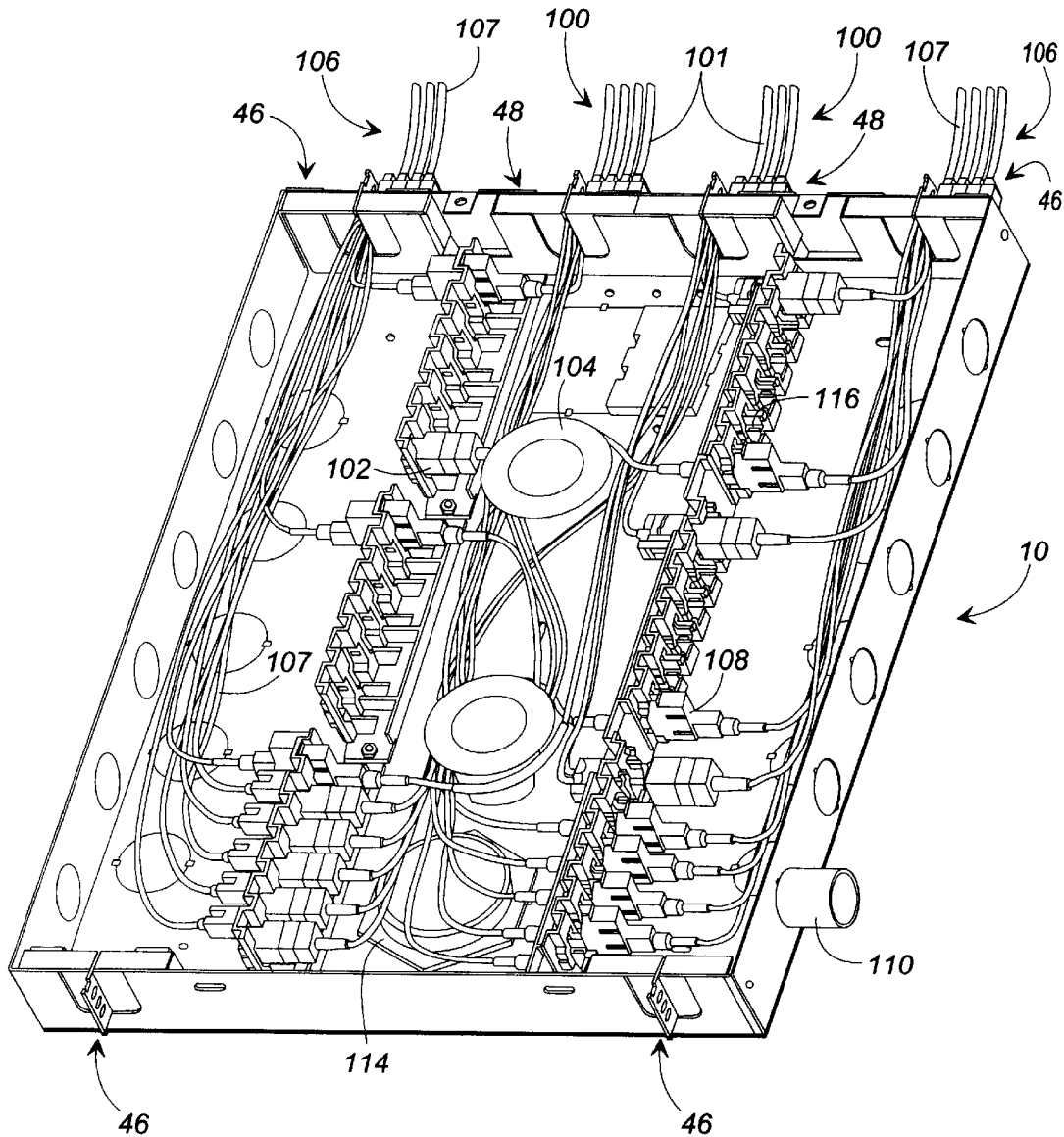
FIG. 6 is a perspective view showing an exemplary use of the distribution box shown in FIGS. 1 and 2.

The primary components of the data/communication distribution box 10 having been described in the foregoing, typical use of the box now will be discussed. As indicated in FIG. 6, the distribution box 10 can be used to facilitate a plurality of connections therein. Normally, horizontal wiring 100 comprised of a plurality of wire and/or optical fiber cables 101, enters the distribution box 10 through one of the entrance openings 48. As indicated in the insulation members 70 disposed within these openings 48 must be separated to permit passage of the horizontal wiring 100. However, due to the flexibility of these insulation members 70, the insulation members conform to the shape of the wiring entering the distribution box 10 so that egress of sparks, flames, and gases from the box is hindered. Once passing through the entrance openings 48, the wiring 100 enters the central space 40 of the interior space 34. Once in this space, the individual cables can be routed to appropriate mounting ports 80. When these cables contain conductive wires, the cables normally are directly connected to a connector module such as an M-module 102. When the cables are fiber optic cables, the individual jacketed fibers can be wrapped around fiber reels 104 which mount to the base 14 of the distribution box 10 with fasteners (not shown) that are received into the threaded openings 32 of the base (FIG. 1). The dimensions and positioning of these reels 104 are such that the minimum bend radius of the fiber cables can be strictly observed so as to minimize fiber damage and transmission losses. Once spooled in this fashion, the individual fibers can be connected to a connector module such as a duplex SC module 108 or an LC module (not shown).

Once all the horizontal wiring 100 has been secured within the central space 40 of the distribution box 10, zone wiring 106, normally comprising a plurality of modular cords 107, can be connected between the distribution box 10 and the particular office modules. As with the horizontal wiring cables 101, the zone wiring modular cords 107 are fitted in place within the proper connector modules. Once properly connected, the individual modular cords 107 can be extended through any one of the exit openings 46 of the distribution box 10 by passing the cords through the insulation members 70 positioned in the insulation spaces 68 of the box. Typically, the distribution box will facilitate at least approximately 36 different mounting ports. Due to the high capacity of connections this permits, each connection box normally can be used as a consolidation point for at least approximately 12 different modular offices.

Where non-plenum rated cable is used between the distribution box 10 and the office modules, this cable can be routed through cable conduits (not shown) which connect to the distribution box 10 at one or more of the substantially circular punch-outs 24, 54. By way of example, FIG. 6 illustrates the connection of a conduit end fitting 110 positioned within a circular punch-out 54 of the second side wall 23 of the distribution box 10. Accordingly, non-plenum rated cables can be routed through such conduit and into the distribution box 10 without creating a fire or toxic gas hazard. As further is illustrated in FIG. 6, a substantially large conduit can be connected to the distribution box 10 with a fastening element 114 at the relatively large circular punch-out 26 of the base 14. Moreover, as indicated in this figure, when the substantially rectangular punch-out 28 of the base 14 is used, a bushing 116 can be placed around the edges of the open punch-out to ensure that cables passing therethrough are not scrapped or otherwise damaged. The substantially rectangular punch-out 28 is most useful when the distribution box 10 is mounted to a cable raceway (not shown). As is known in the art, cable raceways typically comprise bifurcated conduits in which one-half of the raceway contains all power lines while the other half contains all data and/or communications lines. In that it is not always clear which side is which when the distribution box is mounted to a raceway, the substantially rectangular punch-out 28 includes two sections, one of which will be aligned with each side of the raceway to which it is mounted.

Figure 7:
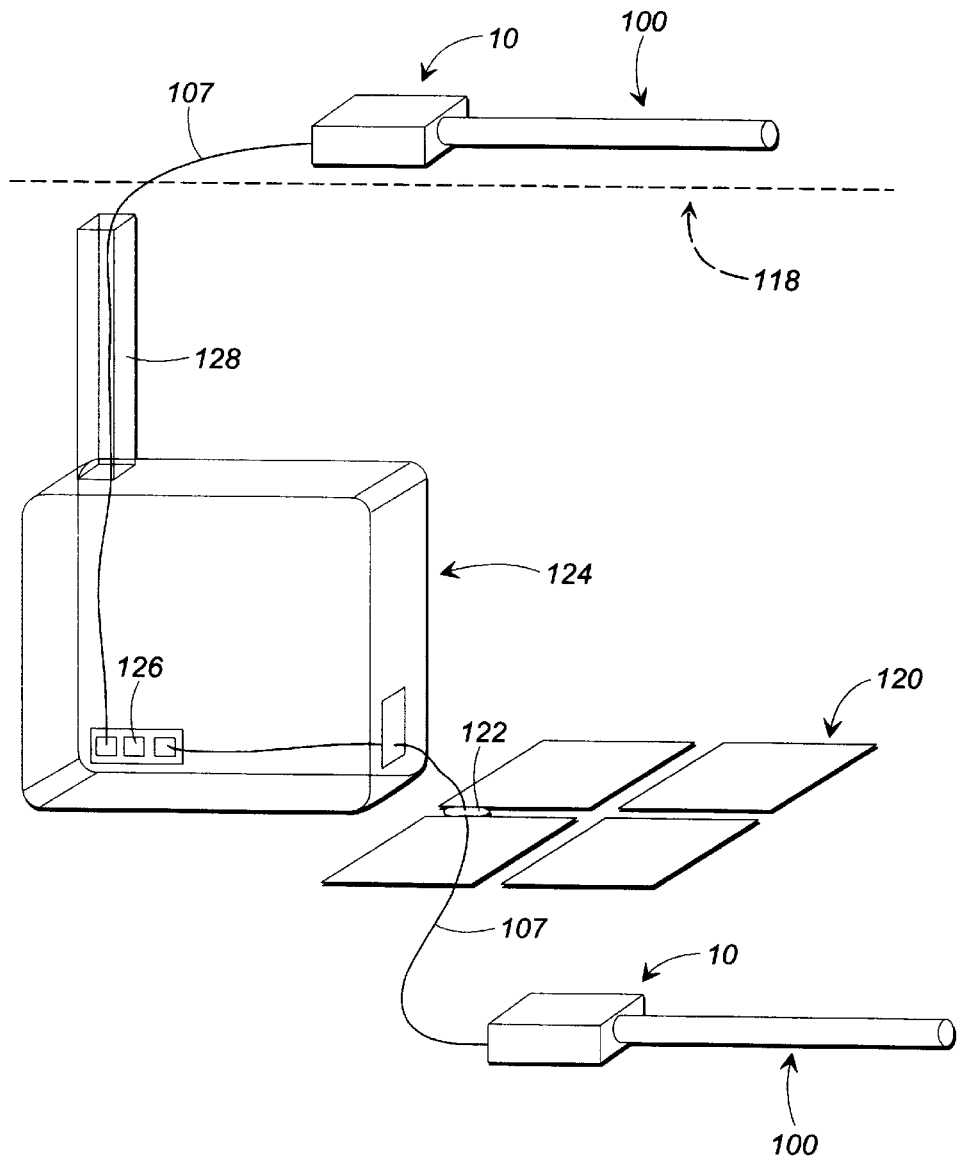
FIG. 7 is a schematic view depicting use of distribution boxes as consolidation points in an office building.

FIG. 7 schematically illustrates implementation of two distribution boxes 10 in an office environment. As is indicated in this figure, one of the distribution boxes is mounted above a drop ceiling 118, for example in a trapeze mounting arrangement (not shown), while the other is mounted below a removable floor 120. As shown in the figure, a zone wiling modular cord 107 from the distribution box 10 mounted below the removable floor 120 can extend through an opening 122 in the floor and into a modular furniture panel 124 to connect to a modular fixture receptacle 126. Similarly, a zone wiring extension cord 107 can extend from the distribution box 10 mounted above the drop ceiling 118 and down a hollow post 128 that extends from the drop ceiling down to the modular furniture panel 124 such that this extension cord can also connect to the modular furniture receptacle 126. In addition to the mounting scenarios depicted in FIG. 7, it is to be appreciated that the distribution box also can be mounted to a permanent post, if desired While preferred embodiments of the invention have been disclosed in detail in the foregoing description and drawing, it will be understood by those skilled in the art that variations and modifications thereof can be made without departing from the spirit and scope of the invention as set forth in the following claims.

What is claimed is:

1. A data/communications distribution box, comprising: a base, first and second ends, and first and second sides, said base, ends, and sides forming an interior space of said distribution box, said first end including a plurality of cable openings adapted to permit the passage of cable into and out of said interior space; a cover sized and configured to fit about said first and second ends and said first and second sides so as to close said interior space; a plurality of connector brackets disposed within said interior space formed by said base, ends, and sides, said connector brackets each including a plurality of mounting ports adapted to receive a variety of different types of connector modules which are used to connectorize data/communications wires and fibers; and an insulation fence positioned within said interior space adjacent at least one of said ends, said insulation fence and said at least one of said ends forming at least one insulation space to receive insulation material to prevent the potential spread of sparks, flame, and smoke.

2. The distribution box of claim 1, wherein said connector brackets are aligned in rows so as to divide said interior space into a central space and first and second lateral spaces.

3. The distribution box of claim 2, wherein said connector bracket includes an elongated base and an elongated connnectorization portion that extends upwardly from said base, said mounting ports of each connector bracket being formed in said connectorization portion.

4. The distribution box of claim 3, wherein said connector bracket includes an elongated module support which is adapted to physically support the connector modules that are disposed in the mounting ports of said connectorization portion.

5. The distribution box of claim 1, wherein said base includes a plurality of punch-outs adapted to receive cable conduits for connection of the conduits to said box.

6. The distribution box of claim 5, wherein said punch-outs of said base include a substantially rectangular punch-out adapted for receiving cables from a cable raceway.

7. The distribution box of claim 1, wherein said first and second sides include a plurality of punch-outs adapted to receive cable conduits for connection of the conduits to said box.

8. The distribution box of claim 1, wherein said insulation material is placed at said ends of said base.

9. The distribution box of claim 8, wherein said insulation material is positioned within an insulation space formed adjacent to said ends that prevents the potential emission of sparks, flame, and smoke from said interior space.

10. A data/communications distribution box, comprising:
   a base, first and second end walls, and first and second side walls, said base, end walls, and side walls forming an interior space of said distribution box, said first and second end walls including a plurality of cable openings formed therein adapted to permit the passage of cable into and out of said interior space;
   a removable cover sized and configured to fit about said first and second end walls and said first and second side walls so as to close said interior space;
   a plurality of connector brackets disposed within said interior space formed by said base, end walls, and side walls, said connector brackets each including a plurality of mounting ports adapted to receive a variety of different types of connector modules which are used to connectorize data/communications wires and fibers;
   an insulation fence positioned within said interior space adjacent said first end wall, said insulation fence and said first end wall together forming a first insulation space adapted to receive a first insulation material; and
   at least one cable retainer positioned adjacent at least one of said cable openings formed in said second end wall, said cable retainer and said second end wall together forming a second insulation space adapted to receive a second insulation material.

11. The distribution box of claim 10, wherein said connector brackets are aligned in rows so as to divide said interior space into a central space and first and second lateral spaces.

12. The distribution box of claim 11, wherein said connector brackets each include an elongated base and an elongated connnectorization portion that extends upwardly from said base, said mounting ports of each connector bracket being formed in said connectorization portion.

13. The distribution box of claim 12, wherein said connector brackets each include an elongated module support which is adapted to physically support the connector modules that are disposed in the mounting ports of said connectorization portion.

14. The distribution box of claim 10, wherein said insulation fence includes a plurality of strain reliefs that are arranged so as to align with said cable openings of said first end wall.

15. The distribution box of claim 14, wherein said insulation fence and said first end form a plurality of insulation spaces adapted to receive insulation members.

16. The distribution box of claim 15, further comprising a plurality of insulation members disposed within said insulation spaces, said insulation members substantially blocking said cable openings of said first end to prevent the potential spread of sparks, flame, and smoke from said interior space.

17. The distribution box of claim 10, wherein said base and said side walls include a plurality of punch-outs adapted to receive cable conduits for connection of the conduits to said box.

18. A data/communications distribution box, comprising:
   a base, first and second ends, and first and second sides, said base, ends, and sides forming an interior space of said distribution box, said first end including a plurality of cable openings adapted to permit the passage of cable into and out of said interior space;
   a cover sized and configured to fit about said first and second ends and said first and second sides so as to close said interior space;
   a plurality of connector brackets disposed within said interior space formed by said base, ends, and sides, said connector brackets each including a plurality of mounting ports adapted to receive a variety of different types of connector modules which are used to connectorize data/communications wires and fibers; and
   an insulation fence positioned within said interior space adjacent said first end, said insulation fence and said first end together forming at least one insulation space adapted to receive insulation material.

19. The distribution box of claim 18, wherein said insulation fence includes a plurality of strain reliefs that are arranged so as to align with said cable openings of said first end.

20. The distribution box of claim 19, wherein said insulation fence and said first end form a plurality of insulation spaces adapted to receive insulation members.

21. The distribution box of claim 20, further comprising a plurality of insulation members disposed within said insulation spaces, said insulation members substantially blocking said cable openings of said first end to prevent the potential spread of sparks, flame, and smoke from said interior space.

22. A data/communications distribution box, comprising:
   a base, first and second ends, and first and second sides, said base, ends, and sides forming an interior space of said distribution box, said first end including a plurality of cable openings adapted to permit the passage of cable into and out of said interior space, said second end includes at least one cable opening adapted to permit passage of cable into and out of said interior space, and wherein said distribution box further comprises at least one cable retainer positioned adjacent said at least one cable opening, said cable retainer and said second end together forming an insulation space adapted to receive an insulation member;
   a cover sized and configured to fit about said first and second ends and said first and second sides so as to close said interior space; and
   a plurality of connector brackets disposed within said interior space formed by said base, ends, and sides, said connector brackets each including a plurality of mounting ports adapted to receive a variety of different types of connector modules which are used to connectorize data/communications wires and fibers.

23. The distribution box of claim 22, wherein said connector brackets are aligned in rows so as to divide said interior space into a central space and first and second lateral spaces.

24. The distribution box of claim 23, wherein said connector bracket includes an elongated base and an elongated connnectorization portion that extends upwardly from said base, said mounting ports of each connector bracket being formed in said connectorization portion.

25. The distribution box of claim 24, wherein said connector bracket includes an elongated module support which is adapted to physically support the connector modules that are disposed in the mounting ports of said connectorization portion.

26. The distribution box of claim 22, further comprising an insulation fence positioned within said interior space adjacent said first end, said insulation fence and said first end together forming at least one insulation space adapted to receive insulation material.

27. The distribution of box of claim 26, wherein said insulation fence includes a plurality of strain reliefs that are arranged so as to align with said cable openings of said first end.

28. The distribution box of claim 27, wherein said insulation fence and said first end form a plurality of insulation spaces adapted to receive insulation members.

29. The distribution box of claim 28, further comprising a plurality of insulation members disposed within said insulation spaces, said insulation members substantially blocking said cable openings of said first end to prevent the potential spread of sparks, flame, and smoke from said interior space.

30. The distribution box of claim 22, wherein said second end includes at least one cable opening adapted to permit passage of cable into and out of said interior space, and wherein said distribution box further comprises at least one cable retainer positioned adjacent said at least one cable opening, said cable retainer and said second end together forming an insulation space adapted to receive an insulation member.

31. The distribution box of claim 22, wherein said base includes a plurality of punch-outs adapted to receive cable conduits for connection of the conduits to said box.

32. The distribution box of claim 31, wherein said punch-outs of said base include a substantially rectangular punch-out adapted for receiving cables from a cable raceway.

33. The distribution box of claim 22, wherein said first and second sides include a plurality of punch-outs adapted to receive cable conduits for connection of the conduits to said box.

* * * * *